G. L. PHELPS.
CORN HUSKING MACHINE.
APPLICATION FILED JULY 1, 1912.
1,157,038.
Patented Oct. 19, 1915.
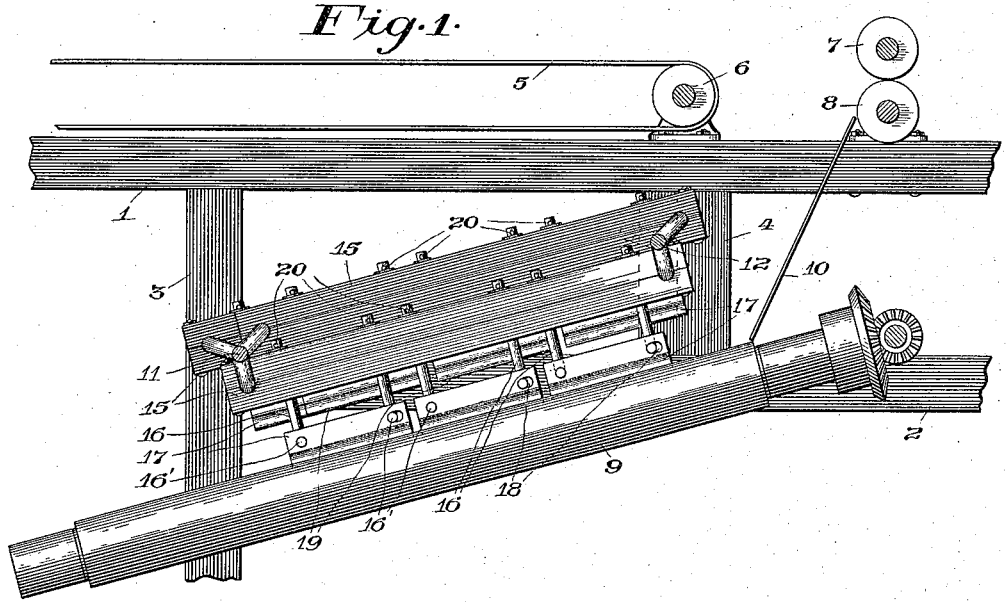
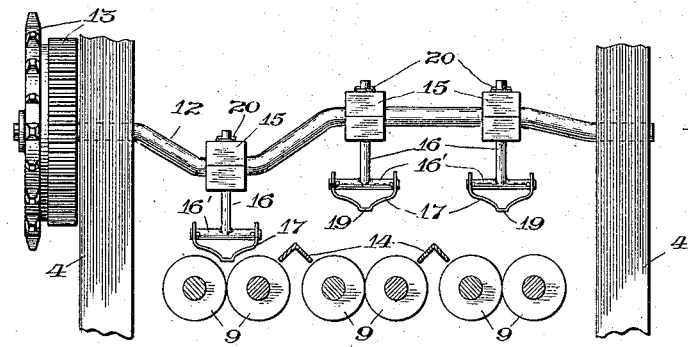
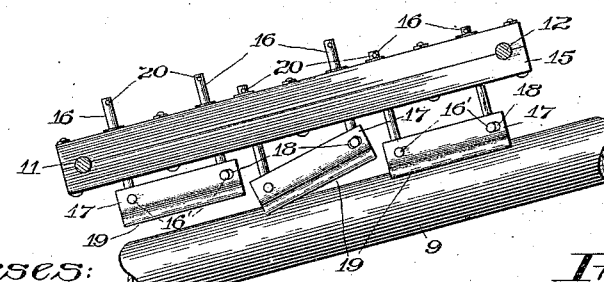
Witnesses:
F. W. Hoffmeister
C. C. Palmer
Inventor.
George L. Phelps
By E. W. Burgess
Attorney

UNITED STATES PATENT OFFICE.

GEORGE L. PHELPS, OF CHICAGO, ILLINOIS, ASSIGNOR TO INTERNATIONAL HARVESTER COMPANY OF NEW JERSEY, A CORPORATION OF NEW JERSEY.

CORN-HUSKING MACHINE.

1,157,038.      Specification of Letters Patent.      Patented Oct. 19, 1915.

Application filed July 1, 1912. Serial No. 706,865.

*To all whom it may concern:*

Be it known that I, GEORGE L. PHELPS, a citizen of the United States, residing at Chicago, in the county of Cook and State of Illinois, have invented certain new and useful Improvements in Corn-Husking Machines, of which the following is a specification.

My invention relates to corn huskers, and in particular to improved means for pressing the unhusked ears of corn in engagement with the husking rollers as they pass from the receiving ends of the rollers toward the discharge ends thereof; the object of my invention being to provide a construction simple in its parts and efficient in operation. I attain this object by means of the mechanism illustrated by the accompanying drawings, in which—

Figure 1 is a side elevation of part of a corn husking machine having my invention embodied in its construction; Fig. 2 is a partial end elevation of Fig. 1; and Fig. 3 is a detached detail of part of Fig. 1 designed to illustrate the operation of the ear pressing mechanism.

The same reference characters designate like parts throughout the several views.

The frame of the machine, shown in part only, is designed to carry stalk feeding and ear snapping rollers, shredding mechanism and corn husking rollers, and includes upper and lower longitudinally arranged side frame members 1 and 2, respectively, upon opposite sides of the machine, and front and rear vertically arranged frame members 3 and 4, respectively, that are secured to the side frame members. 5 represents a stalk feeding apron mounted upon a driving roller 6 journaled in bearings carried by the frame of the machine; 7 and 8 upper and lower snapping rollers, respectively; 9 the corn husking rollers arranged in pairs and inclined downward from front to rear of the machine and driven in opposite directions by any preferred means; 10 an inclined deck leading from the front side of the snapping rollers to the receiving end of the husking rollers. The parts as described are common in the class of machines indicated and are not of my invention.

11 and 12 represent multiple throw crank shafts journaled in bearings carried from the vertical frame members 3 and 4, respectively, and 13 represents gear members secured to one end of the shaft and which may be operatively connected with a moving part of the machine, as desired.

There are three pairs of husking rollers in the machine as illustrated, and 14 represents longitudinally arranged guard members carried by the frame of the machine and located above the intervening space between the middle pair of rollers and the adjacent pairs upon opposite sides thereof.

15 represents longitudinally arranged supports or bars having opposite ends thereof journaled upon the crank portions of the multiple throw crank shafts 11 and 12, the bars being arranged above the husking rollers and in vertical planes intermediate the axis of each pair of coacting husking rollers. Carried by each of the bars 15 are a series of pairs of presser plate supports or carrying members 16, having shank portions spaced apart in the direction of the axes of the husking rollers, having T-shaped heads $16^1$, and adapted to rise and fall freely at right angles thereto.

17 represents presser plates or ear retarders having opposite sides thereof turned upward and provided with lateral openings therein that receive the opposite ends of a pair of the heads of members 16, one of the openings 18 upon each side of the plates being elongated in a manner permitting either end thereof to rise or fall independent of the opposite end, as shown in Fig. 3. The plates are curved laterally inward and downward below the T-members and substantially concentric with the axes of the rollers and provided with a narrow flattened portion 19 intermediate the axes of the husking rollers.

In operation the ears of corn are directed to the receiving ends of the husking rollers by means of the deck 10, and the bars 15 are driven in an orbital path controlled by the multiple throw crank shafts 11 and 12, and the presser plates 17 engage the ears and press them in contact with the husking rollers, the plates being free to rise and fall bodily, or at either end thereof to accommodate large or small ears, and having the downward movement thereof limited by means of the pins 20 through the upper ends of the members 16 engaging with the upper sides of the bars 15.

What I claim as my invention, and desire to secure by Letters Patent, is:

1. In a corn handling machine, an elongated downwardly converging ear retarder of substantially uniform wedge shaped cross section throughout its length.

2. In a corn handling machine, a freely movable elongated ear retarder having the cross section of a downwardly converging truncated wedge throughout its length.

3. In a corn husker, an ear retarder of substantially V-shaped cross section, a support having arms journaled in one end thereof, and a second supporting member in which said support is bodily movable.

4. In a corn husker, an elongated ear retarder of substantially V-shaped cross section, a plurality of supports pivoted in the opposite ends thereof, and a second supporting member for said supports in which the latter are freely movable bodily independently one of the other.

5. In a corn husker, a frame, a plurality of husking rolls, a plurality of transversely extending crank shafts above the same, a longitudinally extending member connected between the cranks of said shafts, and a plurality of independently movable retarders carried between said member and said rolls and operatively connected to the former having either end of the same freely movable toward or away from said member and rolls.

6. In a corn husker, a frame, a plurality of husking rolls journaled therein, a longitudinally extending bar disposed above the interval between said rolls, elongated ear retarders of substantially V-shaped cross section extending into proximity to said rolls and over the interval between the same, upstanding supports therefor pivotally connected to the opposite ends of said retarders and operatively connected to said bar freely movable bodily with respect thereto, and means imparting an orbital movement to said bar.

7. In a corn husker, a frame, a plurality of husking rolls journaled therein, a plurality of cranks extending transversely of said rolls, a longitudinally extending member attached to said cranks and actuated with an orbital movement thereby, a plurality of retarders, and a plurality of attaching members therefor pivotally connected to said retarders with a loose motion connection whereby all parts thereof are bodily movable toward or away from said longitudinally extending member operatively connected to the latter.

8. A corn husking machine including, in combination, husking rollers arranged in pairs, rotatable in opposite directions and inclined downward from the receiving end toward the discharge end thereof, multiple throw crank shafts arranged above said rollers and having the axes thereof in a transverse direction relative to the axes of said rollers, longitudinally arranged bars having opposite ends thereof journaled upon said crank shafts, and presser plates having a sliding link connection with said bars, said plates being adapted to engage with the ears of corn and free to rise and fall bodily, or at either end thereof independent of the opposite end.

9. A corn husking machine including, in combination, husking rollers arranged in pairs, rotatable in opposite directions and inclined downward from the receiving end toward the delivery end thereof, multiple throw crank shafts arranged above said rollers and having the axes thereof in a transverse direction relative to the axes of said rollers, longitudinally arranged bars having opposite ends thereof journaled upon said crank shafts, presser plate carrying members having shank portions slidable freely in the openings through said bars and arranged in spaced relation throughout the length thereof, said carrying members having T-heads arranged transversely relative to the axes of said rollers, presser plates having opposite sides thereof turned upward and provided with openings that receive opposite ends of the T-shaped heads of a pair of plate carrying members, the shank portions of said carrying members being free to rise or fall independent of each other.

GEORGE L. PHELPS.

Witnesses:
WILLIAM CLARK,
EDWARD J. TEUFEL.

Copies of this patent may be obtained for five cents each, by addressing the "Commissioner of Patents, Washington, D. C."